(12) United States Patent
Kanehara et al.

(10) Patent No.: US 7,282,002 B2
(45) Date of Patent: Oct. 16, 2007

(54) BELT FOR CONTINUOUSLY VARIABLE TRANSMISSION

(75) Inventors: Shigeru Kanehara, Wako (JP); Ken Kanokogi, Wako (JP); Toru Yagasaki, Wako (JP); Masamichi Harada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 607 days.

(21) Appl. No.: 10/874,746

(22) Filed: Jun. 24, 2004

(65) Prior Publication Data

US 2005/0003917 A1    Jan. 6, 2005

(30) Foreign Application Priority Data

Jul. 4, 2003    (JP)    ............................. 2003-192077

(51) Int. Cl.
*F16G 1/22*    (2006.01)
(52) U.S. Cl. ...................................... 474/242; 474/201
(58) Field of Classification Search ................ 474/201, 474/242; 134/10, 30, 37; 72/53
See application file for complete search history.

(56) References Cited

U.S. PATENT DOCUMENTS 4,826,473 A * 5/1989 Miyawaki .................... 474/242

FOREIGN PATENT DOCUMENTS

| EP | 0218352 A1 | * | 4/1987 |
| EP | 1 072 815 A1 | | 1/2001 |
| EP | 1 167 813 A1 | | 1/2002 |
| EP | 1179690 A1 | * | 2/2002 |
| EP | 1 267 091 A2 | | 12/2002 |
| JP | 63-280946 A | * | 11/1988 | ................ 474/242 |
| JP | 03-229038 A | * | 10/1991 | ................ 474/242 |
| JP | 04-83941 A | * | 3/1992 |
| JP | 5-14028 | | 4/1993 |
| JP | 06-79626 A | * | 3/1994 |
| JP | 10-170691 A | * | 6/1998 |
| JP | 2003-269546 | | 9/2003 |

* cited by examiner

Primary Examiner—Marcus Charles
(74) Attorney, Agent, or Firm—Arent Fox LLP

(57) ABSTRACT

A belt for a continuously variable transmission comprises endless plate-like rings 2 and a plurality of plate-like elements 3, which are placed adjacent to one another and slidably on the rings 2, so that the rings 2 are disposed on the saddle portions 34 of the elements 3, respectively. In each element 3, a first recess 42 is provided at the upper innermost part of each saddle portion 34 such that the first recess 42 is continuous to a corresponding lower side end of the neck portion 33. In addition, a second recess 43 is provided at the lower innermost part of each ear portion 35 such that the second recess 43 is continuous to a corresponding upper side end of the neck portion 33. At least one of the first and second recesses 42 and 43 is in an elliptic arc figure, in a compound arc figure that comprises various circular arcs or in a compound arc figure that comprises an elliptic arc and one or more circular arcs.

12 Claims, 3 Drawing Sheets

BELT FOR CONTINUOUSLY VARIABLE TRANSMISSION

FIELD OF THE INVENTION

The present invention relates to a belt used in a continuously variable transmission for a vehicle and more particularly to the structure of an element that is used in plurality for constituting such a belt.

BACKGROUND OF THE INVENTION

Various belt type continuously variable transmissions have been proposed as transmissions for use in vehicles like automobiles. Generally, a conventional belt type continuously variable transmission comprises two pulleys and a belt. One of the pulleys, each having a circumferentially extending V-shaped groove, is provided on a rotational shaft and the other is provided on another shaft, and the belt having a V-shaped cross section is disposed around these pulleys for power transmission. While the power is being transmitted from one of the rotational shafts to the other, the widths of the circumferential grooves of these pulleys are controlled in an inverse proportion continuously to vary in adjusting the speed change ratio of the transmission.

For example, a prior-art belt, which is used in such a belt type continuously variable transmission, comprises laminated endless flat rings and a plurality of elements, which are in contact one after another in succession along the rings, which support the elements slidably. FIG. 3 shows an example of element, which is used for constituting such a belt for use in a continuously variable transmission.

The prior-art element 200 shown in FIG. 3, which is punched out from a metal plate (not shown), comprises a body portion 201, a head portion 202 and a neck portion 203 in a one-piece body. The body portion 201 is designed to come into contact with a pulley of a continuously variable transmission (not shown), and the head portion 202 is located above the body portion 201 with the neck portion 203 connecting the body portion 201 and the head portion 202. The neck portion 203 has a width narrower than those of the head and body portions 201 and 202. Furthermore, a pair of saddle portions 204 are provided symmetrically at the right and left upper parts of the body portion 201, and a pair of ear portions 205 are provided at the right and left sides of the head portion 202 that face the saddle portions 204, respectively.

By this design of the element 200, a ring-accommodating space 210, which is to accommodate a ring (not shown), is defined on each side of the element by the upper end of the saddle portion 204, the side end of the neck portion 203 and the lower end of the ear portion 205. When rings are accommodated in the ring-accommodating spaces 210, the rings are placed on the saddle portions 204, respectively. Furthermore, a cylindrical nose portion 206 is provided extruding from one face of the head portion 202 while a cylindrical hole 207 is provided on the other face of the head portion 202, so that the nose portion 206 of one element 200 can be fitted into the hole 207 of another element 200. Moreover, a first recess 208 is provided at each upper innermost part of the saddle portions 204 in an arc figure connecting smoothly to a corresponding lower side end of the neck portion 203 while a second recess 209 is provided at each lower innermost part of the ear portions 205 in an arc figure connecting smoothly to a corresponding upper side end of the neck portions 203.

In such an element exemplified by the above description, for avoiding stress concentration at the part where the upper innermost part of the saddle portion meets the lower side end of the neck portion, for example, Japanese Utility-Model Publication No. H05(1993)-14028 discloses a method in which the bottom of the recess (for example, the first recess 208 shown in FIG. 3) at the part where the upper innermost part of the saddle portion meets the lower side end of the neck portion is in a convex figure whose peak is approximately at the center in the thickness direction of the plate forming the element.

By the way, a relatively large stress is generated in the part of the element where the lower innermost part of the ear portion meets the upper side end of the neck portion when each element comes into contact with the pulley or goes off from the pulley of a continuously variable transmission in operation. Therefore, for example, if the thickness of the element is increased to secure a sufficient strength for this part, then the efficiency of power transmission may decrease or a noise may arise. On the other hand, for example, if the above method (disclosed in Japanese Utility-Model Publication No. H05(1993)-14028) is applied also to the part where the lower innermost part of the ear portion meets the upper side end of the neck portion, then a grinding process must be added in the manufacturing work, and this process can increase the manufacturing cost of the element.

SUMMARY OF THE INVENTION

To solve this problem, it is an object of the present invention to improve the strength of the element without involving a cost increase, a plurality of elements being used to constitute a belt for use in a continuously variable transmission.

For this objective, a belt for a continuously variable transmission according to the present invention comprises endless plate-like rings and a plurality of plate-like elements, which are placed adjacent to one another and slidably on the rings. Each element comprises a body portion, by which the element comes into contact with a pulley of the continuously variable transmission, a head portion, which is located above the body portion, and a neck portion, which has a width narrower than the body portion and the head portion and connects the body portion and the head portion. In each element, saddle portions are provided, respectively, at the right and left upper ends of the body portion while ear portions are provided, respectively, at the right and left sides of the head portion, facing the saddle portions. The rings are accommodated in right and left ring-accommodating spaces, respectively, each ring-accommodating space being defined by the upper end of the saddle portion, the side end of the neck portion and the lower end of the ear portion, so that each ring is disposed on the saddle portion.

Furthermore, a first recess is provided at the upper innermost part of each saddle portion such that the first recess is continuous to a corresponding lower side end of the neck portion while a second recess is provided at the lower innermost part of each ear portion such that the second recess is continuous to a corresponding upper side end of the neck portion. At least one of the first and second recesses is in an elliptic arc figure or in a compound arc figure that comprises various circular arcs or in a compound arc figure that comprises an elliptic arc and one or more circular arcs.

In this belt for a continuously variable transmission, according to the present invention, at least one of the first and second recesses of each element is in an elliptic arc figure, a compound arc figure that comprises various circular arcs, or a compound arc figure that comprises an elliptic arc and one or more circular arcs. Therefore, at least one of the first and second recesses has a contour that changes more gradually than a case where each of the first recess and the second recess were in a circular arc figure. As a result, the stress, which would concentrate around the recesses if they were in a circular arc figure, will not concentrate around at least one of the first and second recesses and will rather dissipate. The elliptic arc figure or the compound arc figure, which comprises various circular arcs or comprises an elliptic arc and one or more circular arcs, of (at least one of) the first and second recesses can be achieved by the same manufacturing process that were applied in a case where the first and second recesses were in a circular arc figure. Therefore, according to the present invention, without any increase in the manufacturing cost, an improvement is made in the strength of the element around at least one of the first and second recesses.

Preferably, the second recess is in the elliptic arc figure or the compound arc figure, which comprises various circular arcs or comprises an elliptic arc and one or more circular arcs, and the upper ends of the saddle portions are crowned, respectively, so that the rings disposed on the right and left saddle portions are upward-curved, respectively. Furthermore, it is preferable that each element be configured such that the top of each ring, which is upward-curved, is positioned outward with respect to the point where the second recess meets the straight line that defines the lower end of a corresponding ear portion extending outward from the second recess. In this way, a clearance is secured between the elements and the rings in vertical direction to prevent the elements from prying the rings in the ring-accommodating spaces during the operation of the belt in a continuously variable transmission. As a result, stress increase in the rings is avoided especially when the elements are about to engage with a pulley of the continuously variable transmission, and this stress control effectively prevents the belt from rolling.

Furthermore, each element is provided preferably with a nose portion on one face of the body portion or the head portion in the direction of movement of the element in the belt and provided also with a hole on the other face, into which hole the nose portion can fit. It is preferable that the first recess or the second recess whichever is located closer to the body portion or the head portion that has the nose portion and the hole be in an elliptic arc figure, a compound arc figure that comprises various circular arcs, or a compound arc figure that comprises an elliptic arc and one or more circular arcs. In this way, the first recess or the second recess that is closer to the hole is contoured with a change more gradual than a case where the first and second recesses were in a circular arc figure. Also, the distance between the hole and the first recess or the second recess that is closer to the hole is longer than the case where these recesses were in a circular arc figure, and this construction according to the present invention strengthens the part of the element around the first recess or the second recess that is closer to the hole.

It is preferable that the head portion be provided with the nose portion and the hole and that the minimum dimension in thickness between the hole and the ring-accommodating space defined by the second recess be greater than that in a case where the ring-accommodating space were defined by an inverted contour of the first recess. By this arrangement, a plurality of elements can be easily positioned with respect to one another by the nose portion and the hole provided at the head portion of each element. In addition, because the minimum dimension in thickness between the hole and the ring-accommodating space defined by the second recess is greater than a case where the second recess were in a circular arc figure, the strength of each element is improved around the second recess, which is located near the hole of the element.

It is also preferable that at least one of the first and second recesses be treated by a water jet peening to endow that specific part with a compression residual stress. By this treatment, the element can be further strengthened around the first and second recesses.

Preferably, a water jet in the water jet peening is shot in a horizontal direction approximately through the center of the ring-accommodating space or directly to the first recess and directly to the second recess. If the water jet is shot in a horizontal direction approximately through the center of the ring-accommodating space, then the water jet can hit both the first recess and the second recess simultaneously in a single step of the peening process. In this way, the part of the element around the first and second recesses is further strengthened without any manufacturing cost increase. If the water jet is shot directly to the first recess and directly to the second recess, then the element can be endowed with a higher compression residual stress around the first and second recesses.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 2:
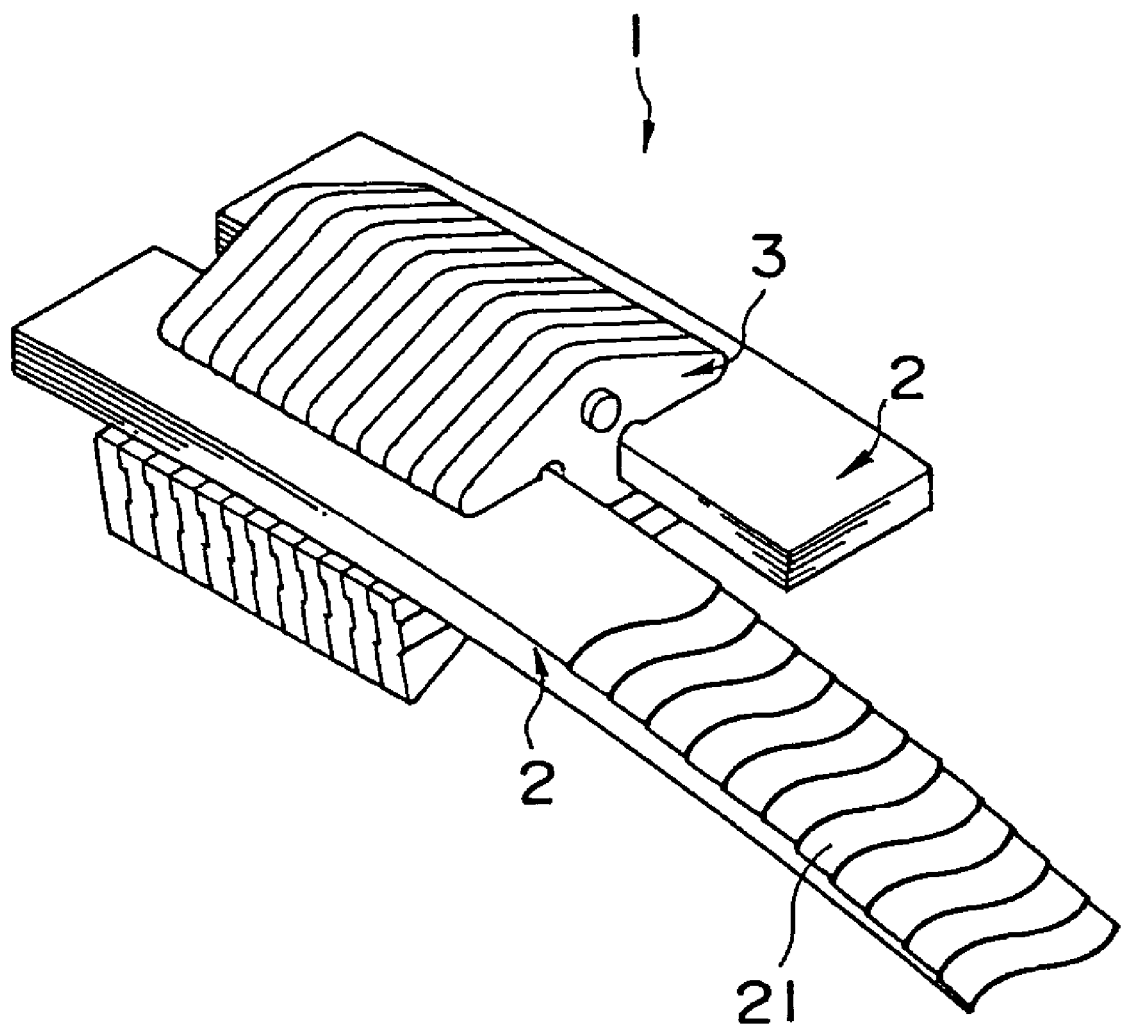
FIG. 2 is a perspective view of the belt for a continuously variable transmission.
Figure 3:
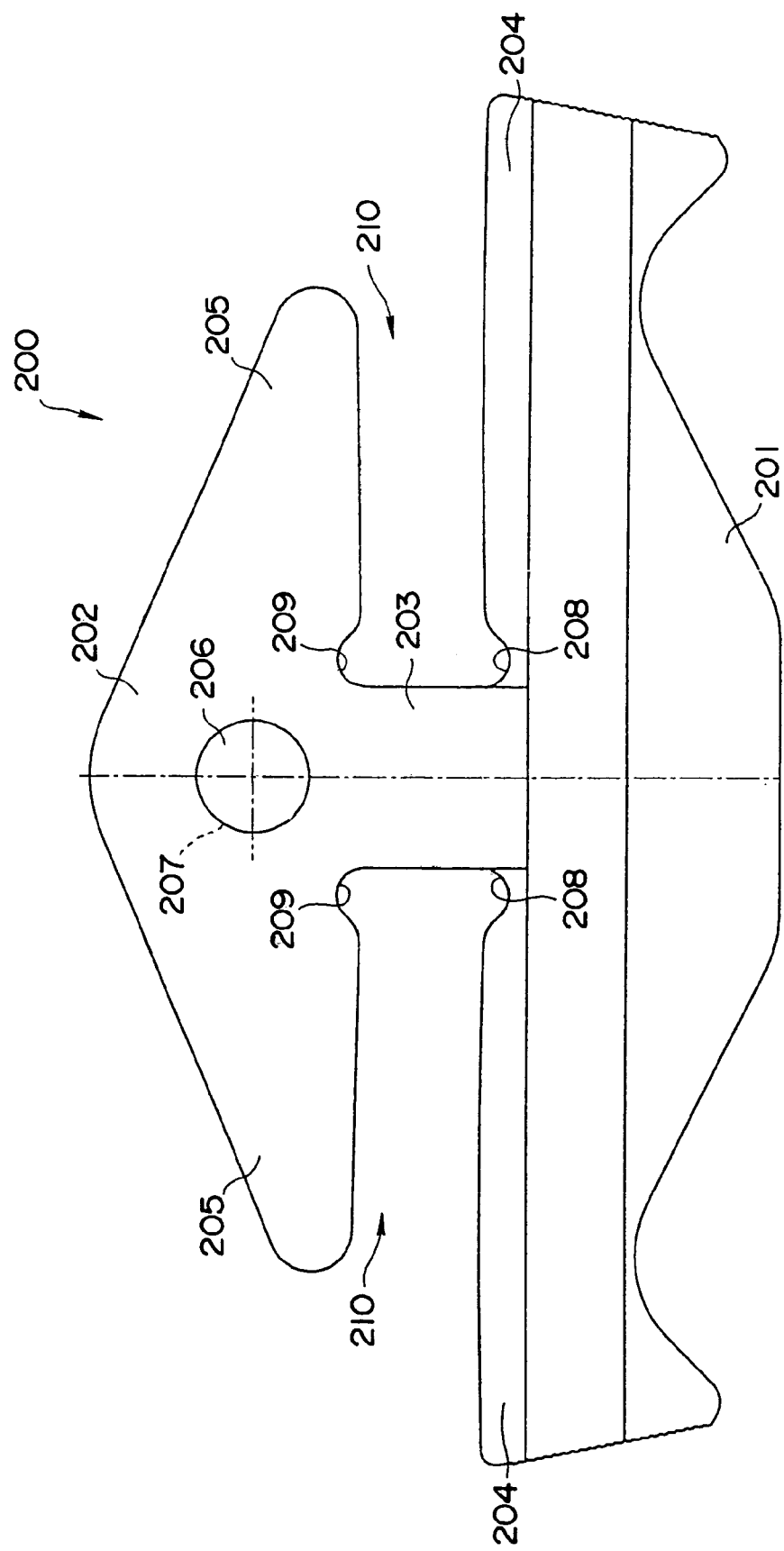
FIG. 3 is a front view of an element that constitutes a prior-art belt used for a continuously variable transmission.

Now, a preferred embodiment of the present invention is described in reference to the drawings. FIG. 2 shows a belt for a continuously variable transmission, according to the present invention. The belt 1 comprises two endless plate-like rings 2 and a plurality of elements 3, which are placed abutting one another slidably between the rings 2. Each ring 2 comprises a plurality of metallic plate-like ring members 21 in lamination, and it is endless and flexible.

Figure 1:
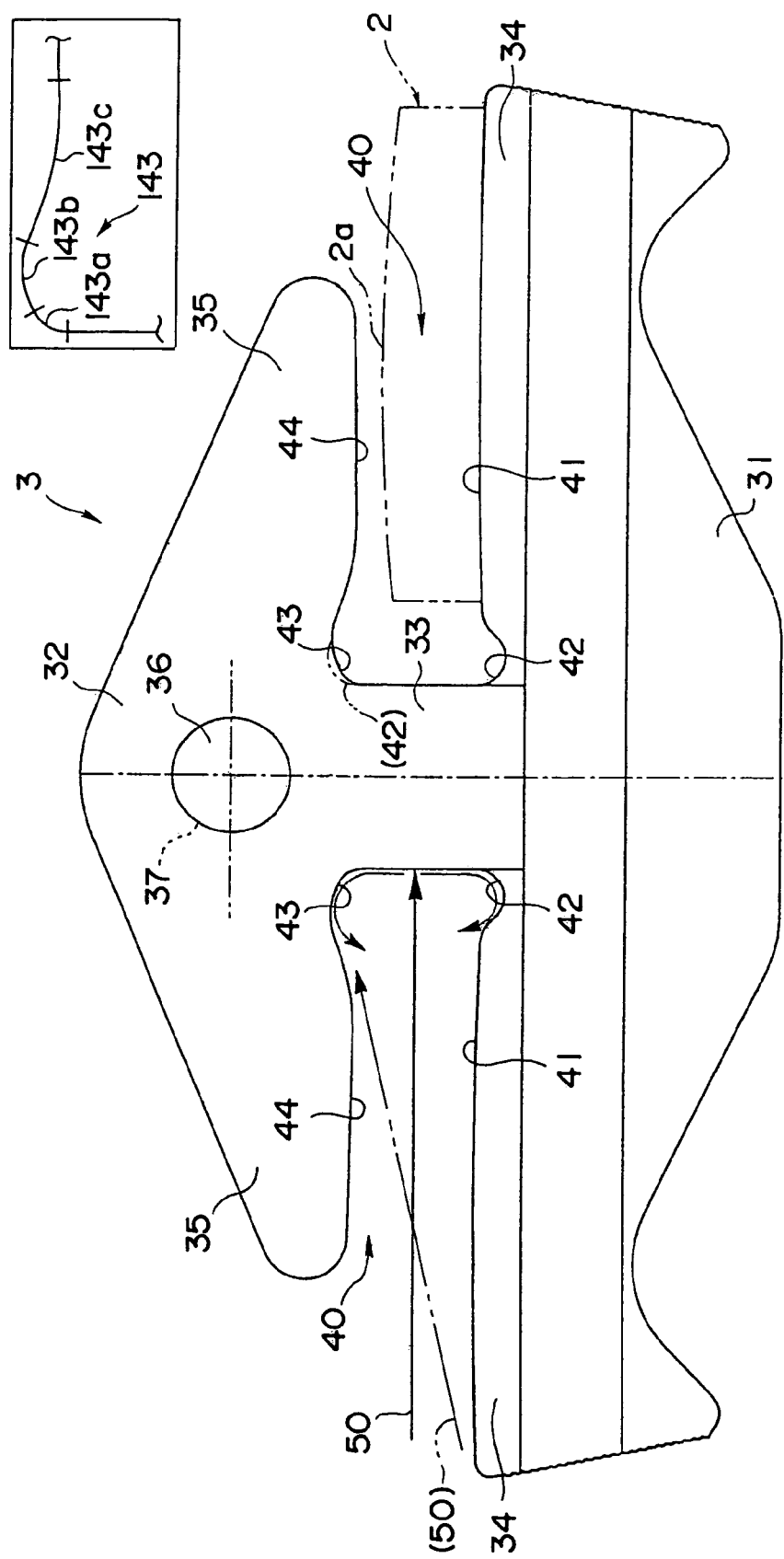
FIG. 1 is a front view of an element that constitutes a belt for a continuously variable transmission, according to the present invention.

As shown in FIG. 1, the element 3 comprises a body portion 31, a head portion 32 and a neck portion 33 in a one-piece body, which is punched out from a metal plate (not shown). The body portion 31 is to come into contact with a pulley of a continuously variable transmission (not shown), and the head portion 32 is located above the body portion 31 with the neck portion 33 connecting the body portion 31 and the head portion 32. The neck portion 33 has a width narrower than those of the head and body portions 31 and 32. Furthermore, a pair of saddle portions 34 are provided symmetrically at the right and left upper parts of the body portion 31, and a pair of ear portions 35 are provided at the right and left sides of the head portion 32, the ear portions 35 facing the saddle portions 34, respectively.

Ring-accommodating spaces 40 are defined on the right and left sides of the element by the upper end of the saddle portion 34, the side end of the neck portion 33 and the lower end of the ear portion 35, respectively, and rings 2 are accommodated there and placed on the saddle portions 34, respectively. Furthermore, because crowning 41 is provided on the upper end faces of the saddle portions 34, the rings 2, which are placed on the saddle portions 34, are upward-curved so that the rings 2 will hardly slip out of place. In this way, both the sides of the rings 2 are prevented from contacting the part other than the saddle portions 34 and prevented also from contacting a pulley of a continuously variable transmission (not shown), so as not to impair the durability of the rings. Moreover, a first recess 42 is provided at each upper innermost part of the saddle portions 34 in an arc figure extending smoothly to a corresponding lower side end of the neck portion 33.

Furthermore, the element 3 is provided with a nose portion 36 on the front face of the head portion 32 in the direction of movement of the element in the belt, which comprises a plurality of elements. In addition, the element 3 is provided also with a nose-fitting hole 37 on the rear face of the head portion 32. As a result, the nose portion 36 of one element 3 is fitted into the hole (not shown) of another element, which is positioned adjacently and immediately ahead in the direction of movement, in positioning one element to another. This arrangement of the nose portion 36 and the hole 37 being provided on the opposite sides of the head portion 32, which is flat, is highly effective in the positioning of each element, which is aligned adjacent to one another.

Moreover, a second recess 43 is provided at each lower innermost part of the ear portions 35 in an elliptic arc figure (or a compound arc figure that comprises various circular arcs, or a compound arc figure that comprises an elliptic arc and one or more circular arcs) connecting smoothly to a corresponding upper side end of the neck portions 33. The elliptic arc figure (or the compound arc figure) can be achieved for the second recess 43 by the same manufacturing process (for example, punching) as applied in a case of prior art where the second recess has a circular arc. Therefore, without any increase in the manufacturing cost, an improvement can be made in the strength of the element 3 around the second recess 43 because the element 3 according to the present invention has a longer distance between the hole 37 and the second recess 43 than a prior-art element.

As shown in FIG. 1, the minimum dimension in thickness between the hole 37 and the ring-accommodating space 40 defined by the second recess 43 is greater than a case where the ring-accommodating space were defined by the line (two-dot chain line in the drawing) that is drawn in the figure of an inverted first recess 42. Therefore, the minimum dimension in thickness between the hole 37 and the ring-accommodating space 40 defined by the second recess 43 is greater than a case where the second recess 43 were defined by a circular arc. As a result, the element 3 around the second recess 43 is comparatively strong.

As shown in the drawing, the lower end of each ear portion 35 from the second recess 43 outward is in straight line 44, and the top 2a of the ring 2, which is upward-curved, is positioned outward with respect to the point where the straight part 44 changes to the second recess 43 in the ear portion 35. In this way, a clearance is secured between the elements 3 and the rings 2 in vertical direction, preventing the elements 3 from prying the rings 2 in the ring-accommodating spaces 40 during the operation of the belt in a continuously variable transmission. Such a prying would increase the stress of the belt. In addition, this design is effective especially in preventing the belt from rolling, which would otherwise occur when the elements are about to engage with a pulley (not shown) during the operation and would increase the stress of the rings.

In addition, in a manufacturing process, the first recess 42 and the second recess 43 of the element 3 are bombarded by a water jet 50 that includes particle members such as tiny glass beads and steel balls. This process is called "water jet peening". As shown in FIG. 1, a water jet 50 containing particle members (not shown) is shot by a shooting device (not shown) in a horizontal direction (approximately through the center of the ring-accommodating space 40) to the center of the side end of each neck portion 33. In this way, the water jet 50 can hit the center of the side end of the neck portion 33 without hitting the upper end of the saddle portion 34 and the lower end of the ear portion 35 in each ring-accommodating space 40, and then the water jet 50 having reached the center of the side end of the neck portion 33 divides into a downward jet and an upward jet being guided by the side end of the neck portion 33, finally hitting the first recess 42 and the second recess 43, respectively.

As a result, the first recess 42 and the second recess 43 receive a compression residual stress, respectively, from the impact of the water jet 50 hitting these recesses. This residual stress improves the strength of the element 3 around the first recess 42 and the second recess 43. Also, because this procedure can shoot the two places, i.e., the first recess 42 and the second recess 43, simultaneously, with a water jet 50 containing particle members, no cost increase is required for this procedure, which improves the strength of the element 3 around the first recess 42 and the second recess 43. By the way, if the water jet 50 is shot directly to the first recess 42 and directly to the second recess 43, then a higher compressive residual stress can be endowed in those recessed portions. Especially in the second recess 43, the water jet 50 can maintain a comparatively high flow rate because the figure of the second recess 43 has a gradual change and does not have any spot that cannot receive the direct hit of the water jet 50. Such a spot exists in the prior-art recess having a circular arc figure. This higher flow rate of the water jet can contribute a higher compressive residual stress to the second recessed portion.

For assembling a belt 1 for a continuously variable transmission, a plurality of elements 3 described above are aligned adjacent to one another in a circle, with two rings 2 passing through the right and left ring-accommodating spaces 40 and being placed on the right and left saddle portions 34 of each element. This belt 1 is disposed around the pulleys of a continuously variable transmission, which is not described in the drawings. Each of these pulleys, which are mounted on the two rotational shafts of the continuously variable transmission, respectively, has a V-shaped circumferential groove, where the belt 1 is hung around.

In the above described belt 1 for a continuously variable transmission, the second recess 43 is in an elliptic arc figure (or a compound arc figure that comprises various circular arcs, or a compound arc figure that comprises an elliptic arc and one or more circular arcs) as mentioned above. Because the figure of the second recess 43 has a change more gradual than a case where the second recess were in a circular arc, the stress at the second recess 43, which would be otherwise concentrated, is dissipated. The elliptic arc figure (or the compound arc figure) of the second recess 43 can be formed by the same manufacturing process as applied in a case where the second recess were in a circular arc figure. Therefore, according to the present invention, the strength of the element 3 around the second recess 43 is improved without any increase in the manufacturing cost.

As mentioned above, the top 2a of the ring 2, which is upward-curved in the element 3, is positioned outward with respect to the point where the second recess 43 meets the straight part 44, which is the outwardly extending lower end of a corresponding ear portion 35. As a result, a clearance is secured between the elements 3 and the rings 2 in vertical direction, preventing the elements 3 from prying the rings 2 in the ring-accommodating spaces 40 during the operation of the belt in a continuously variable transmission. Especially when the elements are about to engage with a pulley (not shown), the stress of the rings tends to increase. If such a prying happened, then it would increase the stress of the belt and would cause the belt to roll. This design according to the present invention is especially effective in preventing the belt from rolling.

As described above, the second recess 43, which is located near the hole 37 of the element 3, is in an elliptic arc figure (or a compound arc figure that comprises various circular arcs, or a compound arc figure that comprises an elliptic arc and one or more circular arcs). As a result, the distance between the hole 37 and the second recess 43 is longer than in the case of a prior-art element. Therefore, the element according to the present invention has an improved strength around the second recess 43.

In other words, the minimum dimension in thickness between the hole 37 and the ring-accommodating space 40 defined by the second recess 43 is greater than in a case where the ring-accommodating space 40 were defined in a contour of an inverted first recess 42, which is a case where the second recess 43 were in a circular arc figure. Therefore, the element 3 according to the present invention has an improved strength around the second recess 43.

A water jet peening is used to endow the portion around the second recess 43 with a compressive residual stress, and thereby, the strength of the element is further improved around the first recess 42 and the second recess 43.

A water jet 50 of the water jet peening is shot in a horizontal direction approximately through the center of the ring-accommodating space 40. This shooting can achieve the water jet 50 hitting both the first recess 42 and the second recess 43 in a single step of the peening process. Therefore, the present invention can improve the strength of the element 3 around the first recess 42 and the second recess 43 without any cost increase.

In the above described embodiment, the second recess 43 is in an elliptic arc figure (or a compound arc figure that comprises various circular arcs, or a compound arc figure that comprises an elliptic arc and one or more circular arcs). However, the present invention is not limited to this embodiment. If the length of the saddle portion 34 is sufficiently long with respect to the width of the ring 2, then also the first recess 42 may be in an elliptic arc figure (or a compound arc figure that comprises various circular arcs, or a compound arc figure that comprises an elliptic arc and one or more circular arcs).

The present invention is not limited to the above described embodiment, in which the second recess 43 is in an elliptic arc figure. For example, the second recess 143 may be in a compound arc figure that comprises three different circular arcs 143a, 143b and 143c as shown in the drawing additionally provided in an rectangle in FIG. 1 or in a compound arc figure that comprises an elliptic arc and one or more circular arcs. Each of the arcs 143a, 143b and 143c has a radius of curvature larger than that of the first recess 42.

As described above, in the belt for a continuously variable transmission, according to the present invention, at least one of the first recess and the second recess is in an elliptic arc figure, a compound arc figure that comprises various circular arcs, or a compound arc figure that comprises an elliptic arc and one or more circular arcs. Therefore, at least one of the first and second recesses has a contour that changes more gradually than a case where the first and second recesses were in a circular arc figure. As a result, the stress, which would concentrate around the recesses if they were in a circular arc figure, will not concentrate in the same manner around at least one of the first and second recesses, and it will rather dissipate. The elliptic arc figure or the compound arc figure, which comprises various circular arcs or comprises an elliptic arc and one or more circular arcs, of (at least one of) the first and second recesses can be achieved by the same manufacturing process as applied in a case where the first and second recesses were in a circular arc figure. Therefore, according to the present invention, without any increase in the manufacturing cost, an improvement can be made in the strength of the element around at least one of the first and second recesses.

In addition to the second recess being in the elliptic arc figure or in the compound arc figure, which comprises various circular arcs or comprises an elliptic arc and one or more circular arcs, the upper ends of the saddle portions of the element are crowned, respectively, so that the rings disposed on the right and left saddle portions of the elements constituting the belt are upward-curved. Furthermore, it is preferable that each element be configured such that the top of each ring, which is upward-curved, is positioned outward with respect to the point where the second recess meets the straight part of the lower end of a corresponding ear portion that extends outward from the second recess. In this way, a clearance is secured between the elements and the rings in vertical direction to prevent the elements from prying the rings in the ring-accommodating spaces during the operation of the belt in a continuously variable transmission. As a result, stress increase in the rings is avoided especially when the elements are about to engage with a pulley of the continuously variable transmission. This effectively prevents the belt from rolling.

Furthermore, each element is provided with a nose portion on one face of the body portion or the head portion in the direction of movement of the element in the belt and provided also with a hole on the other face, into which the nose portion can fit. It is preferable that the first recess or the second recess whichever is located closer to the body portion or the head portion that has the nose portion and the hole be in an elliptic arc figure, a compound arc figure that comprises various circular arcs, or a compound arc figure that comprises an elliptic arc and one or more circular arcs. In this way, the first recess or the second recess that is closer to the hole is contoured with a change more gradual than a case where the first and second recesses were in a circular arc figure. Also, the distance between the hole and the first recess or the second recess that is closer to the hole is comparatively longer. Therefore, the element around the first recess or the second recess that is closer to the hole is especially improved in strength.

In a case where the head portion of the element is provided with the nose portion and the hole, it is preferable that the minimum dimension in thickness between the hole and the ring-accommodating space defined by the second recess be greater than that in a case where the ring-accommodating space were defined by an inverted contour of the first recess. By this arrangement, a plurality of elements can be easily positioned with respect to one another by the nose portion and the hole provided at the head portion of each element. In addition, the minimum dimension in thickness between the hole and the ring-accommodating space defined by the second recess being greater than that in a case where the second recess were in a circular arc improves the strength of the element around the second recess, which is located near the hole of the element.

It is also preferable that at least one of the first and second recesses be treated by a water jet peening to endow that specific part with a compression residual stress. By this treatment, the element can be further strengthened around the first and second recesses.

Preferably, a water jet in the water jet peening is shot in a horizontal direction approximately through the center of the ring-accommodating space or directly to the first recess and directly to the second recess. If the water jet is shot in a horizontal direction approximately through the center of the ring-accommodating space, then the water jet can hit both the first recess and the second recess simultaneously in a single step of the peening process. In this way, the strength of the element around the first and second recesses is further improved without any manufacturing cost increase. If the water jet is shot directly to the first recess and directly to the second recess, then the element is endowed with a higher compression residual stress around the first and second recesses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2003-192077 filed on Jul. 4, 2003 which is incorporated herein by reference.

What is claimed is:

1. A belt for a continuously variable transmission, comprising endless rings and a plurality of plate-like elements, which are placed adjacent to one another and slidably on said rings;
   each of said elements comprising:
   a body portion, by which each element comes into contact with a pulley of said continuously variable transmission;
   a head portion, which is located above said body portion;
   a neck portion, which has a width narrower than said body portion and said head portion, and which connects said body portion and said head portion;
   saddle portions; which are provided, respectively, at right and left upper ends of said body portion;
   ear portions, which are provided, respectively, at right and left sides of said head portion, facing said saddle portions;
   wherein said rings are accommodated in right and left ring-accommodating spaces, respectively, each ring-accommodating space being defined by an upper end of said saddle portion, a side end of said neck portion and a lower end of said ear portion, so that each ring is disposed on said saddle portion;
   a first recess is provided at each upper innermost part of said saddle portions such that said first recess is continuous to a corresponding lower side end of said neck portion;
   a second recess is provided at each lower innermost part of said ear portions such that said second recess is continuous to a corresponding upper side end of said neck portion; and
   at least one of said first and second recesses includes a compound arc figure defined by at least three sequential arcs, each arc having a different radius than the others.

2. The belt for a continuously variable transmission as set forth in claim 1,
   wherein said each element is provided with a nose portion on one face of said body portion or said head portion in a direction of movement of said element, said nose portion extruding in the direction of movement;
   said each element is also provided with a hole on a face located rear to said one face, said hole being a recess, into which said nose portion of an adjacently located element can fit; and
   said first recess or said second recess, whichever is located closer to said body portion or said head portion that is provided with said nose portion and said hole, includes said compound arc figure, and wherein said compound arc figure defines an elliptical shape.

3. The belt for a continuously variable transmission as set forth in claim 1,
   wherein at least one arc of said at lest three arc defining said compound arc figure in said first recess has a smaller radius than a radius of an arc in said compound arc figure in said second recess, wherein a depth of said first recess is deeper than a depth of said second recess.

4. The belt for a continuously variable transmission as set forth in claim 1,
   wherein said head portion is provided with said nose portion and said hole;
   said second recess comprises said compound arc figure, said first recess comprises a single circular arc; and
   each of the at least three arcs defining said compound arc figure of said second recess has a larger radius than that a radius of the single circular arc provided in said first recess.

5. The belt for a continuously variable transmission as set forth in claim 1,
   wherein
   an upper end of each of said saddle portions is crowned, wherein said ring disposed on said saddle portion is upward-curved;
   a lower end of each of said ear portions is defined by said second recess and straight part that extends outward from said second recess; and
   a top of each of said rings, meets said straight part.

6. The belt for a continuously variable transmission as set forth in claim 5,
   wherein said each element is provided with a nose portion on one face of said body portion or said head portion in a direction of movement of said element, said nose portion extruding in the direction of movement;
   said each element is also provided with a hole on a face rear to said one face, said hole being a recess, into which said nose portion of an adjacent element can fit; and said first recess or said second recess, whichever is located closer to said body portion or said head portion that is provided with said nose portion and said hole, includes said compound arc figure, and wherein said compound arc figure defines an elliptical shape.

7. The belt for a continuously variable transmission as set forth in claim 6,
wherein at least one arc of said at least three arcs defining said compound arc figure in said first recess has a smaller radius than a radius of an arc in said compound arc figure in said second recess, and wherein a death of said first recess is deeper than a death of said second recess.

8. The belt for a continuously variable transmission as set forth in claim 6,
wherein
said second recess comprises said compound arc figure, said first recess comprises a single circular arc; and
each of the at least three arcs defining said compound arc figure of said second recess has a larger radius than a radius of the single circular arc provided in said first recess.

9. The belt for a continuously variable transmission as set forth in claim 1,
wherein at least one of said first recess arc and said second recess is endowed with a compression residual stress by means of a water jet peening.

10. The belt for a continuously variable transmission as set forth in claim 9,
wherein a water jet in said water jet peening is shot approximately horizontally and approximately centrally through said ring-accommodating space or shot directly to said first recess and directly to said second recess.

11. The belt for a continuously variable transmission as set forth in claim 1, wherein the at least three arcs comprise at least two concave arcs and at least one convex arc.

12. The belt for a continuously variable transmission as set forth in claim 1, wherein the radius of each arc defining said compound arc figure increases in a direction toward said ear portion.

* * * * *